US008270038B2

(12) United States Patent  
Itoh et al.

(10) Patent No.: US 8,270,038 B2  
(45) Date of Patent: Sep. 18, 2012

(54) IMAGE OUTPUT METHOD AND APPARATUS WITH A CONTROL UNIT INHIBITS OUTPUT OF COMPOSITE IMAGE INCLUDING TWO-DIMENSIONAL BAR CODE AND DOCUMENT IMAGE, IF DENSITY OF THE DOCUMENT IMAGE EXCEEDS THRESHOLD

(75) Inventors: Jun Itoh, Kawasaki (JP); Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/410,616

(22) Filed: Mar. 25, 2009

(65) Prior Publication Data

US 2009/0244639 A1 Oct. 1, 2009

(30) Foreign Application Priority Data

Mar. 28, 2008 (JP) ................................. 2008-087253

(51) Int. Cl.  
*H04N 1/40* (2006.01)

(52) U.S. Cl. ........ 358/3.28; 358/1.9; 358/1.15; 358/540

(58) Field of Classification Search .................. None  
See application file for complete search history.

(56) References Cited

U.S. PATENT DOCUMENTS

| | | | | |
|---|---|---|---|---|
| 6,839,146 B1* | 1/2005 | Ishida et al. | ................. | 358/1.14 |
| 7,509,060 B2* | 3/2009 | Yaguchi et al. | ................. | 399/15 |
| 7,548,340 B2* | 6/2009 | Ishikawa et al. | ............... | 358/1.9 |
| 7,567,355 B2* | 7/2009 | Matsunoshita | ............... | 358/1.13 |
| 7,580,159 B2* | 8/2009 | Guan et al. | .................... | 358/3.28 |
| 7,894,104 B2* | 2/2011 | Miyajima | .................... | 358/3.28 |
| 7,903,288 B2* | 3/2011 | Takeishi | ......................... | 358/2.1 |
| 8,085,972 B2* | 12/2011 | Kwak et al. | .................... | 382/100 |
| 2003/0179399 A1 | 9/2003 | Matsunoshita | | |
| 2005/0199722 A1* | 9/2005 | Borja | ........................ | 235/462.01 |
| 2006/0119879 A1 | 6/2006 | Nakai et al. | | |
| 2007/0216937 A1* | 9/2007 | Tsutsumi | .................... | 358/1.15 |
| 2008/0080009 A1* | 4/2008 | Masui et al. | ................. | 358/3.28 |
| 2008/0100880 A1* | 5/2008 | Matsunoshita | ............... | 358/471 |
| 2008/0101651 A1* | 5/2008 | Matsunoshita | ............... | 382/100 |
| 2008/0151312 A1* | 6/2008 | Nakano | ........................ | 358/3.28 |
| 2009/0050700 A1* | 2/2009 | Kamijoh et al. | .............. | 235/440 |
| 2009/0161141 A1* | 6/2009 | Shobu | .......................... | 358/1.14 |
| 2009/0284775 A1* | 11/2009 | Muramatsu | .................... | 358/1.9 |
| 2010/0301111 A1* | 12/2010 | Nakata | .......................... | 235/375 |

FOREIGN PATENT DOCUMENTS

| | | |
|---|---|---|
| JP | 2003-280469 A | 10/2003 |
| JP | 2006-165889 A | 6/2006 |
| JP | 2007074048 A | 3/2007 |

* cited by examiner

*Primary Examiner* — King Poon  
*Assistant Examiner* — Dung Tran  
(74) *Attorney, Agent, or Firm* — Canon U.S.A., Inc. IP Division

(57) ABSTRACT

An image output apparatus includes a determination unit configured to determine whether a density of a document image exceeds a threshold, and a control unit configured to inhibit an output of a composite image including a two-dimensional bar code and the document image if the determination unit determines that the density exceeds the threshold and configured to output the composite image including the two-dimensional bar code and the document image if the determination unit determines that the density does not exceed the threshold.

6 Claims, 16 Drawing Sheets

010, 111, 110, 011 = 2, 7, 6, 3

IMAGE OUTPUT METHOD AND APPARATUS WITH A CONTROL UNIT INHIBITS OUTPUT OF COMPOSITE IMAGE INCLUDING TWO-DIMENSIONAL BAR CODE AND DOCUMENT IMAGE, IF DENSITY OF THE DOCUMENT IMAGE EXCEEDS THRESHOLD

BACKGROUND OF THE INVENTION

1. Field of the Invention

The present invention relates to an image output apparatus, such as an image forming apparatus, which can output an image print product capable of accurately restoring embedded information therefrom.

2. Description of the Related Art

Enhancing the security in offices is now strongly required due to recent development of information technologies (IT). For example, according to recent cases, client information often leaks out of companies so easily that the protection of confidential information belonging to the company or privacy of individual persons becomes a big social problem.

To solve this problem, it is desired to introduce an appropriate Information Technology (IT) mechanism to a managing system for the confidential information. For example, setting an access authority to permit a user to access electronic confidential information or adding a monitoring apparatus to the firewall is effective to prevent the confidential information from leaking out of the company. It is also effective to inhibit bringing any portable medium (e.g., a notebook PC or a USB memory) into or out of the office.

If the confidential information is electronic data, the above-described IT mechanism can effectively function as a means for protecting the confidential information from leaking out of the system. This is because, when the confidential information is electronic data, the confidential information is only accessible via the IT mechanism. Thus, introducing the IT mechanism for the electronic confidential information is meaningful.

On the other hand, when the confidential information is printed on a paper or other recording medium by an image forming apparatus, the above-described conventional IT mechanism is no longer effective to protect the confidential information belonging to the company or the privacy of individual persons, although users may be asked to get a permission to bring the information out of the system. In this respect, compared to the electronic confidential information, ensuring the security of the confidential information printed on a recording medium is difficult.

To solve this problem, various information leak prevention methods are conventionally employed.

As an example method for preventing the leakage of the confidential information, the technique using an electronic watermark or a two-dimensional bar code can be used. More specifically, there is a system capable of embedding copy restriction information in document data, which can inhibit copying the confidential information on a paper or other recording medium. When an image forming apparatus performs a copy operation, the image forming apparatus restores the copy restriction information (i.e., detects copy allowance/inhibition information) to control execution/cancellation of the copy operation for each page.

The copy restriction information is not limited to simply allowing or inhibiting performing a copy operation. For example, as discussed in Japanese Patent Application Laid-Open No. 2003-280469, there is a system capable of embedding password information or user information (to be used to determine copy allowance) as conditional information to allow only specific users to copy the confidential information.

The above-described copy restriction information and trace information (i.e., information to be added to trace a user) can be collectively referred to as "additive security information" or "meta-information" in the following description.

To ensure the effect obtain by the above-described information leak prevention method, the additive security information needs to be accurately restored when the image forming apparatus performs a copy operation. In this respect, as discussed in Japanese Patent Application Laid-Open No. 2006-165889, there is a system capable of causing an image forming apparatus to read a print output product and correcting the additive security information to be added to a document based on the restored result.

Although the above-described system is configured to improve the accuracy in restoring the additive information by performing the correction on the restored result of the additive security information (meta-information), the correction may be ineffective for some types of documents. In this case, the additive security information cannot be restored even if the correction is performed. The reading operation of the additive security information cannot be accurately performed. Accordingly, the security system does not work as intended.

SUMMARY OF THE INVENTION

According to an aspect of the present invention, an image output apparatus includes a determination unit configured to determine whether a density of a document image exceeds a threshold, and a control unit configured to inhibit an output of a composite image including a two-dimensional bar code and the document image if the determination unit determines that the density exceeds the threshold and configured to output the composite image including the two-dimensional bar code and the document image if the determination unit determines that the density does not exceed the threshold.

According to an exemplary embodiment of the present invention, if it is determined that meta-information cannot be accurately restored, the image output apparatus inhibits executing an output of the document or corrects the document image to generate and output a document from which the meta-information can be restored. Therefore, the exemplary embodiment of the present invention can prevent an output of any document from which the meta-information cannot be read, and can enhance the security.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
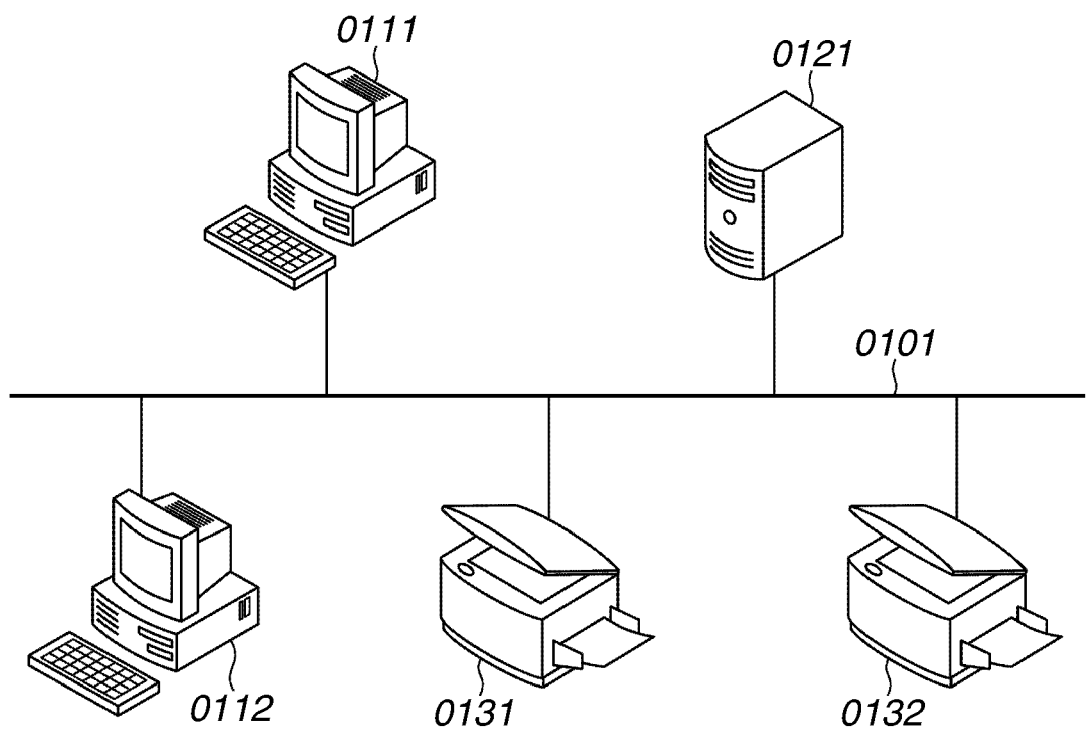
FIG. 1 illustrates an overall system configuration according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus, once an item is described in one figure, it may not be discussed for following figures. Exemplary embodiments will be described in detail below with reference to the drawings.

FIG. 1 illustrates an overall system configuration according to a first exemplary embodiment of the present invention.

The system illustrated in FIG. 1 includes client personal computers (PCs) 0111 and 0112, a print server 0121, and image forming apparatuses 0131 and 0132 (e.g., copy machines) capable of performing printing. The apparatuses illustrated in FIG. 1 are connected to a local area network (LAN) 0101 to communicate with each other via the LAN 0101.

When a user operates the client PC 0111 or 0112, the client PC 0111 or 0112 can generate print data and transmit the generated print data to the print server 0121.

The print server 0121 transmits the received print data to the image forming apparatus 0131 or 0132.

The image forming apparatus 0131 or 0132 interprets the received print data, converts the print data into image data, and generates a print output product (e.g., a printed paper or other recording medium) based on the image data.

The above-described system configuration can be modified to exclude the print server 0121. In this case, the client PC 0111 or 0112 directly transmits the print data to the image forming apparatus 0131 or 0132. In this case, the LAN 0101 can be replaced by any other interface, such as IEEE1284, and universal serial bus (USB).

Next, an instruction to embed copy restriction information or print output trace information (trace information) and an operation to restrict the copy are simply described. In the present exemplary embodiment, the processing for embedding information is to add information in a manner not perceived by users. The present exemplary embodiment realizes embedding meta-information in a document by combining a meta-information image, as part of a background image, with a document image and printing the combined image. As described below, the meta-information can be constituted by low visibility barcodes (LVBC) dots (hereinafter, referred to as "LVBC dots").

Figure 2:
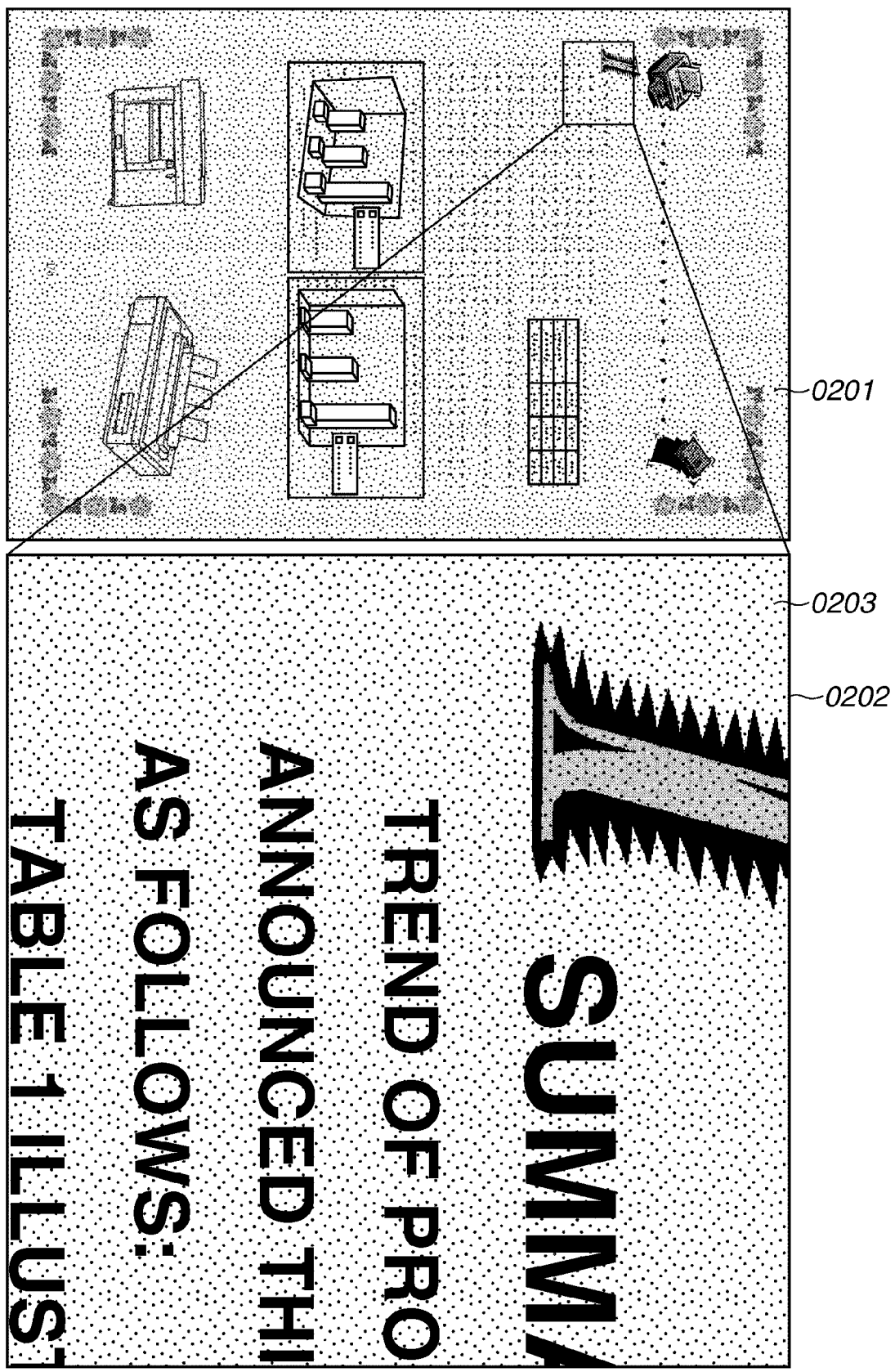
FIG. 2 illustrates an example image of a printed document, which includes a meta-information image as part of a background image combined with a document image.

In the system configuration illustrated in FIG. 1, a user can operate the client PC 0111 or 0112 to instruct embedding copy inhibition information or print output trace information in a print output. The image forming apparatus 0131 or 0132 generates a print output of a composite image including, as a background image, the copy inhibition information or the print output trace information, which is combined with a document image. FIG. 2 illustrates an example print output including the background image.

The following is a detailed description of sequential operations according to the present exemplary embodiment.

The information, which can be combined as a background image of a print output, is not limited to the copy inhibition information or the print output trace information. In this respect, the information to be combined as part of the background image is referred to as "meta-information" in the following description. The background image representing the meta-information (additive security information) is referred to as a "meta-information image."

Example processing for generating and combining a meta-information image, which can be performed by the image forming apparatus, is described below with reference to FIG. 3.

Figure 3:
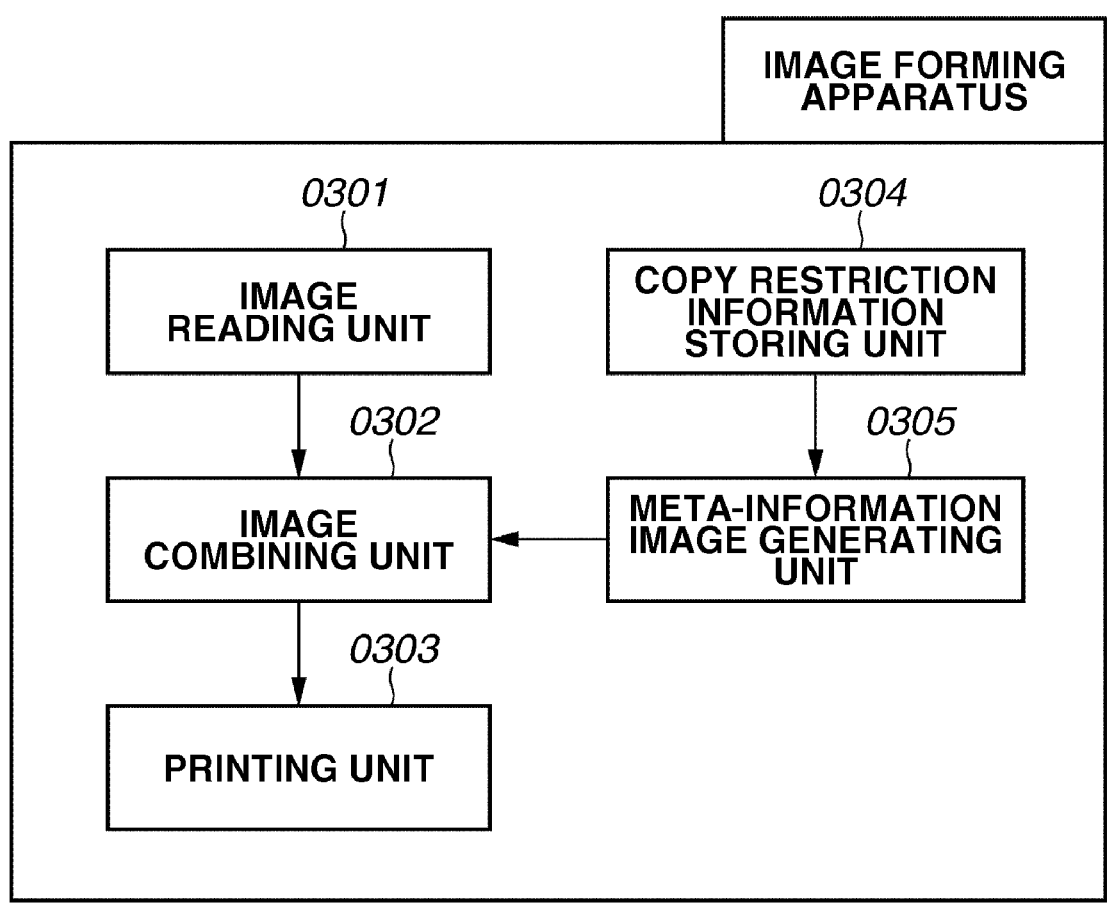
FIG. 3 illustrates a data flow in an image forming apparatus according to the first exemplary embodiment, which generates an image containing meta-information.

FIG. 3 is a data flow diagram of the image forming apparatus configured to generate a copy of a paper document, which includes the copy inhibition information as a background of the print output.

If a user places a document on a scanner (not illustrated) and instructs a copy operation via an operation unit (not illustrated), an image reading unit 0301 is activated to start the copy operation. The image reading unit 0301 reads the document and transmits the read image data to an image combining unit 0302.

A copy restriction information storing unit 0304 transmits copy restriction information, which is stored as a result of operations on various setting dialogs, to a meta-information image generating unit 0305.

The meta-information image generating unit 0305 interprets the received copy restriction information and generates a meta-information image representing meta-information. For example, the meta-information image generating unit 0305 can generate a background image including the meta-information image reflecting the copy restriction information, such as an image constructed by low visibility barcodes (LVBC). The meta-information image generating unit 0305 transmits the generated background image to the image combining unit 0302.

The image combining unit 0302 combines the document image data received from the image reading unit 0301 with the background image received from the meta-information image generating unit 0305, and transmits the composite image data (bitmap image data) to a printing unit 0303.

The printing unit 0303 prints a bitmap image on a paper sheet based on the composite image data received from the image combining unit 0302.

A meta-information embedding technique according to the present exemplary embodiment is described below based on low visibility barcodes (LVBC), which is one of two-dimensional bar codes.

In the image forming apparatus according to the present invention, an information embedding unit is configured to combine an image representing desired information with an image to be printed as a requested print output and print the composite image on an image forming medium, such as a paper sheet or an OHP sheet (hereinafter, referred to as "sheet").

In general, the information embedding unit satisfies the following requirements.

The information embedding unit has the capability of realizing embedding of a sufficient amount of information on a sheet.

The information embedding unit can print information to be embedded on a sheet using a coloring material (e.g., toner or ink) in a manner that the embedded information can be later restored as digital information.

The information embedding unit has a certain degree of durability against any factor disturbing the restoration of information in a copy operation of a document image on a sheet, such as rotation, enlargement, reduction, and partial deletion of the document, and the presence of dull or spoiled signals.

The information embedding unit can realize real-time and speedy performances to inhibit an unauthorized copy of the copy restricted document.

The LVBC according to the present exemplary embodiment can satisfy the above-described requirements.

FIG. 2 illustrates an example image of a printed document including a meta-information image embedded as a background image, which is constructed by the LVBC satisfying the above-described requirements.

FIG. 2 illustrates an entire image 0201 of the document and a partially enlarged image 0202. The enlarged image 0202 includes numerous dots (e.g., 0203), which are seen as a randomly printed dot pattern, in addition to a document image to be printed on a sheet. The dots 0203 express the information to be added.

An example method for embedding the meta-information based on the LVBC is described below with reference to FIG. 2.

The embedding method using the LVBC includes printing a dot pattern, which is referred to as a grid, to embed meta-information, on a sheet, in addition to a document image to be printed as a print output. In FIG. 2, the grid is an assembly of dots 0203 spaced at predetermined intervals in the vertical and horizontal directions. A virtual grid pattern appears as virtual lines, which are spaced at constant intervals, extending in the vertical and horizontal directions, when the dots are connected by the shortest distance virtual lines (guide lines).

The meta-information can be input as a binary (2-valued) data that does not exceed a constant size. To express the meta-information, dislocation of each dot in one of eight directions (up-and-down, right-and-left, and diagonal directions) is determined according to the meta-information. More specifically, the position of each dot is offset or deviated from the center (relative to a reference position of the grid). In the present exemplary embodiment, the group of dislocated dots is combined with the document image and printed as a composite image including the embedded meta-information as a background image.

Figure 4:
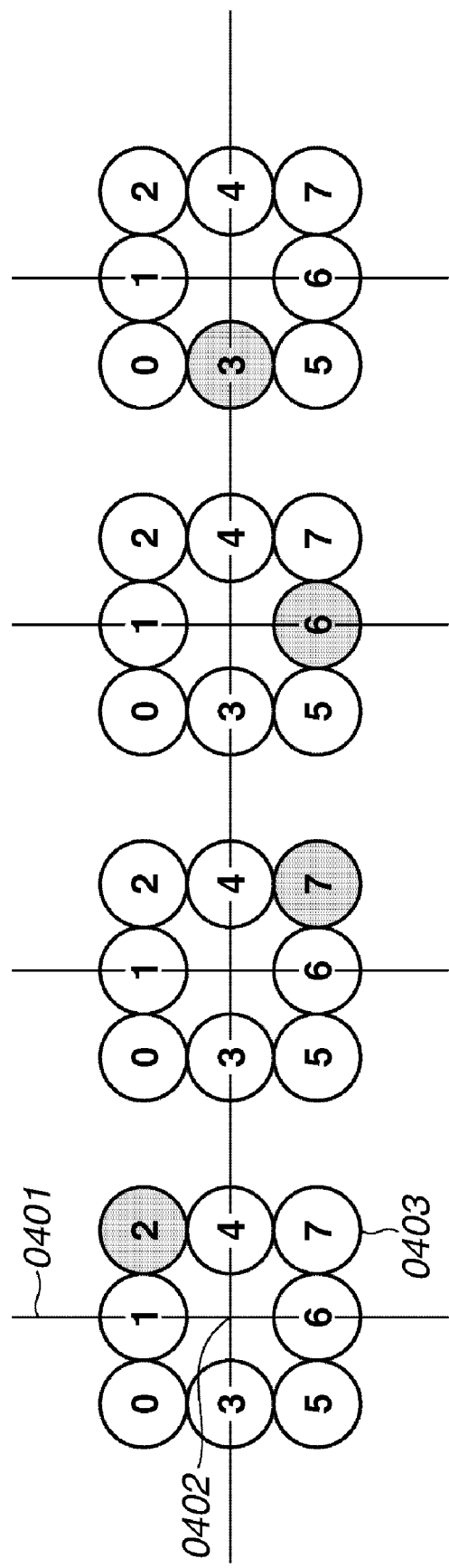
FIG. 4 illustrates example binary data "010111110011b", which can be embedded as meta-information formed by low visibility barcodes (LVBC).

FIG. 4 illustrates example binary data "010111110011b", which is embedded as meta-information.

In FIG. 4, vertical and horizontal lines 0401 are virtual guide lines defining positions of the grid. As described above, the grid pattern appears when the guide lines connect the dots in the shortest distance, which constitute the grid. No dot is positioned on the center 0402. The position of each dot 0403 is dislocated from the center 0402.

The binary data "010111110011b" can be divided into 3-bit data of 010, 111, 110, and 011, which can be further converted into 2, 7, 6, and 3 through the decimal conversion. As illustrated in FIG. 4, each dot 0403 constituting the grid can express one of eight numerical values (0, 1, 2, 3, 4, 5, 6, and 7) corresponding to the above-described eight directions.

Figure 5:
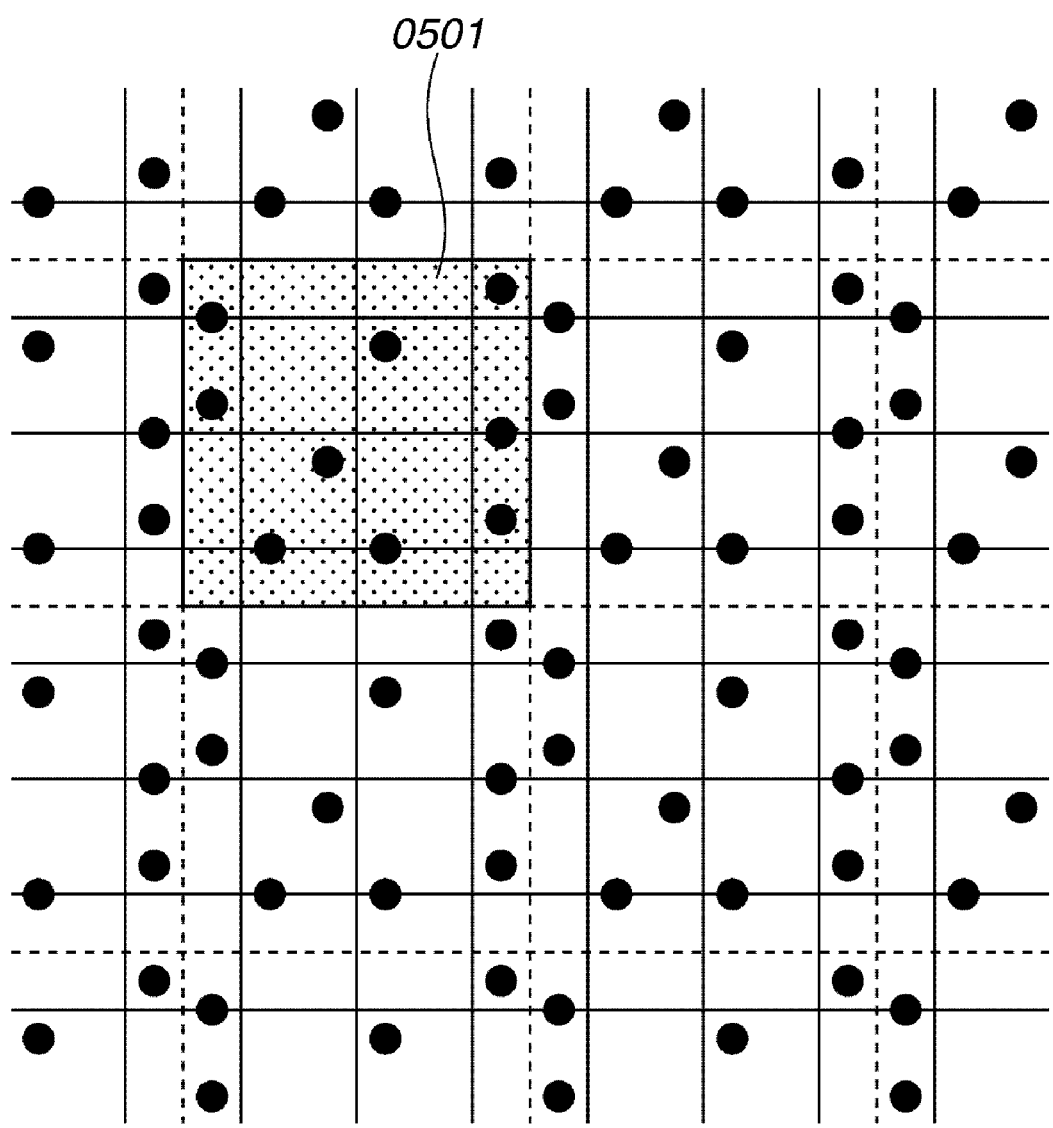
FIG. 5 illustrates a repetition pattern of dot blocks representing meta-information.

More specifically, numerical values 2, 7, 6, and 3 can be expressed by dislocating the dot 0403 from the center 0402 to upper right, lower right, bottom, and left, respectively. The LVBC-based technique can embed meta-information of approximately 2000 bytes on a sheet by repeating the above-described processing. As illustrated in FIG. 5, a repetitive pattern of the dots, which constitute the meta-information, is printed on a sheet.

In FIG. 5, a block 0501 is a unit area of the dots constituting the meta-information. Printing the repetitive dot pattern of the block 0501 can increase the redundancy and therefore can prevent the dots from being erroneously recognized as part of an image and can improve the reliability of the restored information against spoil, shrinkage, and partial breakage of a sheet.

The LVBC-based meta-information embedding is a DA conversion for converting the meta-information (digital data) into analog data to be recorded on a sheet, and therefore can be realized with a relatively simple arrangement.

Figure 6:
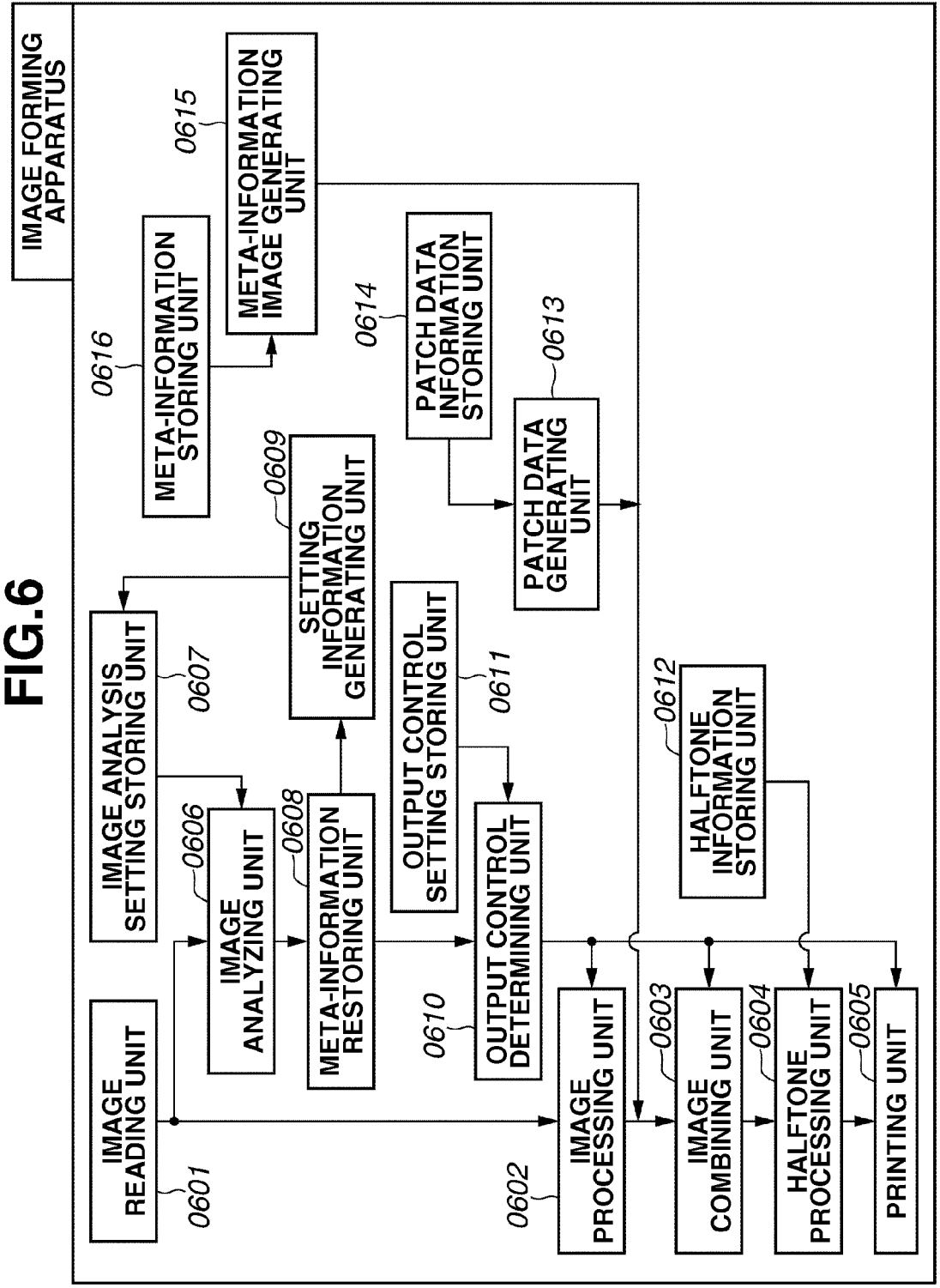
FIG. 6 illustrates a print output control dependent on the density of a document image, in a copy job performed by the image forming apparatus, according to the first exemplary embodiment.

FIG. 6 illustrates a print output control reflecting the density of a document image, which is part of a copy job performed by the image forming apparatus according to the first exemplary embodiment. A meta-information storing unit 0616 stores meta-information to be embedded, which can be printed as LVBC dots on a sheet. A meta-information image generating unit 0615 generates an LVBC dot pattern image (a meta-information image) based on the meta-information stored in the meta-information storing unit 0616. An image combining unit 0603 combines the LVBC dot pattern image generated by the meta-information image generating unit 0615 with a document image, and generates a piece of output image. A meta-information restoring unit 0608 detects the LVBC dot pattern combined with the document image from the image entered by the image reading unit 0601, and restores the meta-information represented by the dot pattern.

An example control operation for generating a print output including the combined meta-information, which is dependent on the density of a document image, is described below.

As described above, the meta-information can be a dot pattern embedded in a document. Accordingly, the control operation includes detecting the dots from a document and analyzing the detected dots to restore the embedded meta-information. Therefore, if the density of a document is insufficient, the dots representing the meta-information cannot be detected and the meta-information cannot be restored.

To solve this problem, the LVBC-based embedding technique uses a dot pattern having an appropriate redundancy, which is enhanced by printing the repetitive pattern on the print surface. However, if the processing target is a full-scale picture image, the density of the document is high everywhere on the entire printed surface. The embedded meta-information sometimes cannot be accurately restored.

On the other hand, the present exemplary embodiment detects the density of a document image and evaluates an influence of the document image density on the restoration of meta-information, before generating a print output including the meta-information combined with the document image. If it is determined that the meta-information cannot be restored from the document image, the present exemplary embodiment inhibits printing the target document image. Otherwise, the present exemplary embodiment decreases the density of the document image to obtain a corrected document image from which the meta-information can be surely restored, before starting the printing of the target document image. Thus, if the additive security information cannot be restored from a print output, the present exemplary embodiment can prevent the print output from becoming a security hole.

The above-described print output control operation is described below in more detail.

Figure 7:
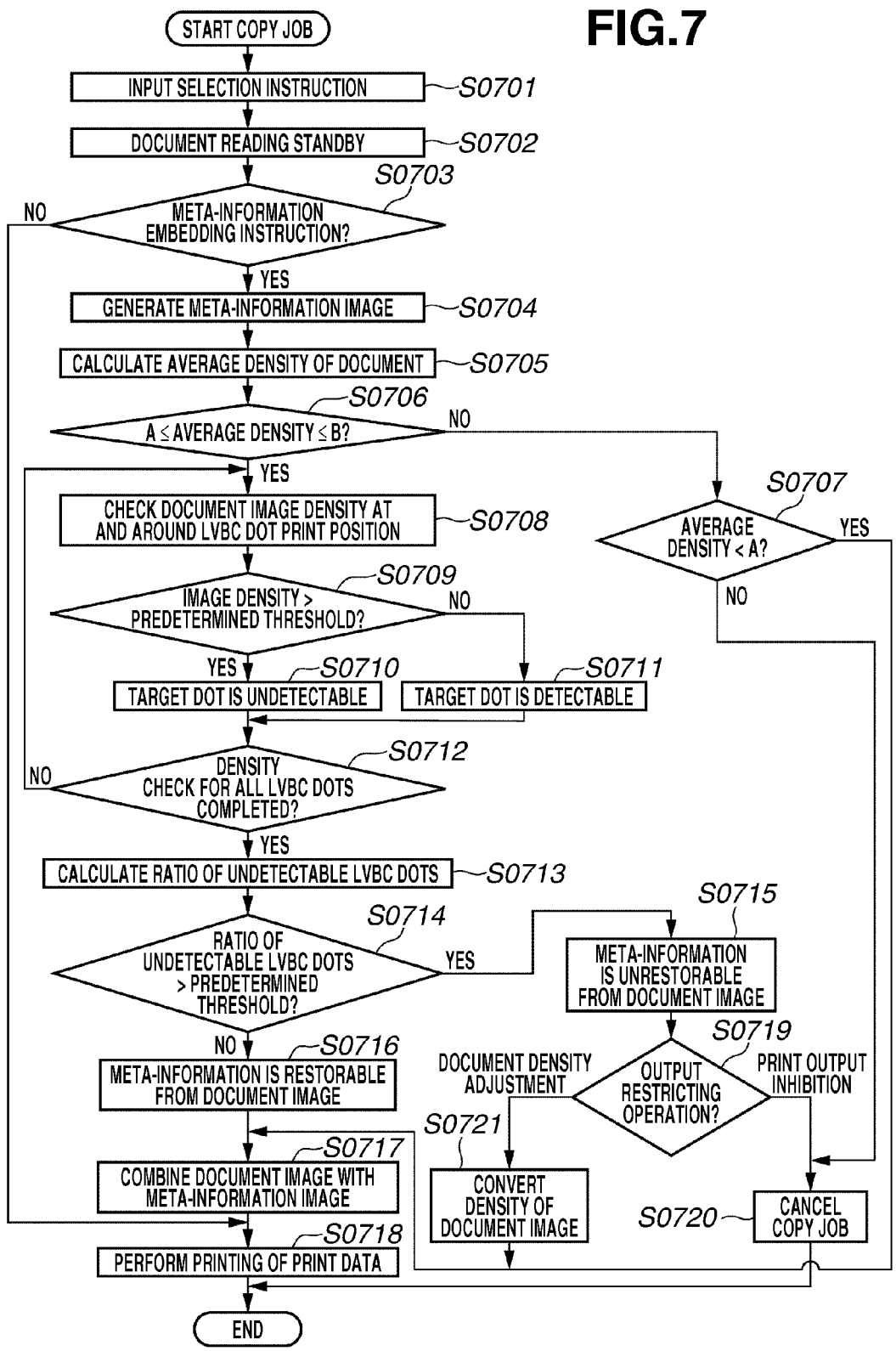
FIG. 7 is a flowchart illustrating an operation flow of the document image density dependent print output control, in the copy job performed by the image forming apparatus, according to the first exemplary embodiment.

FIG. 7 illustrates a copy operation flow including the above-described print output restricting operation.

Figure 11:
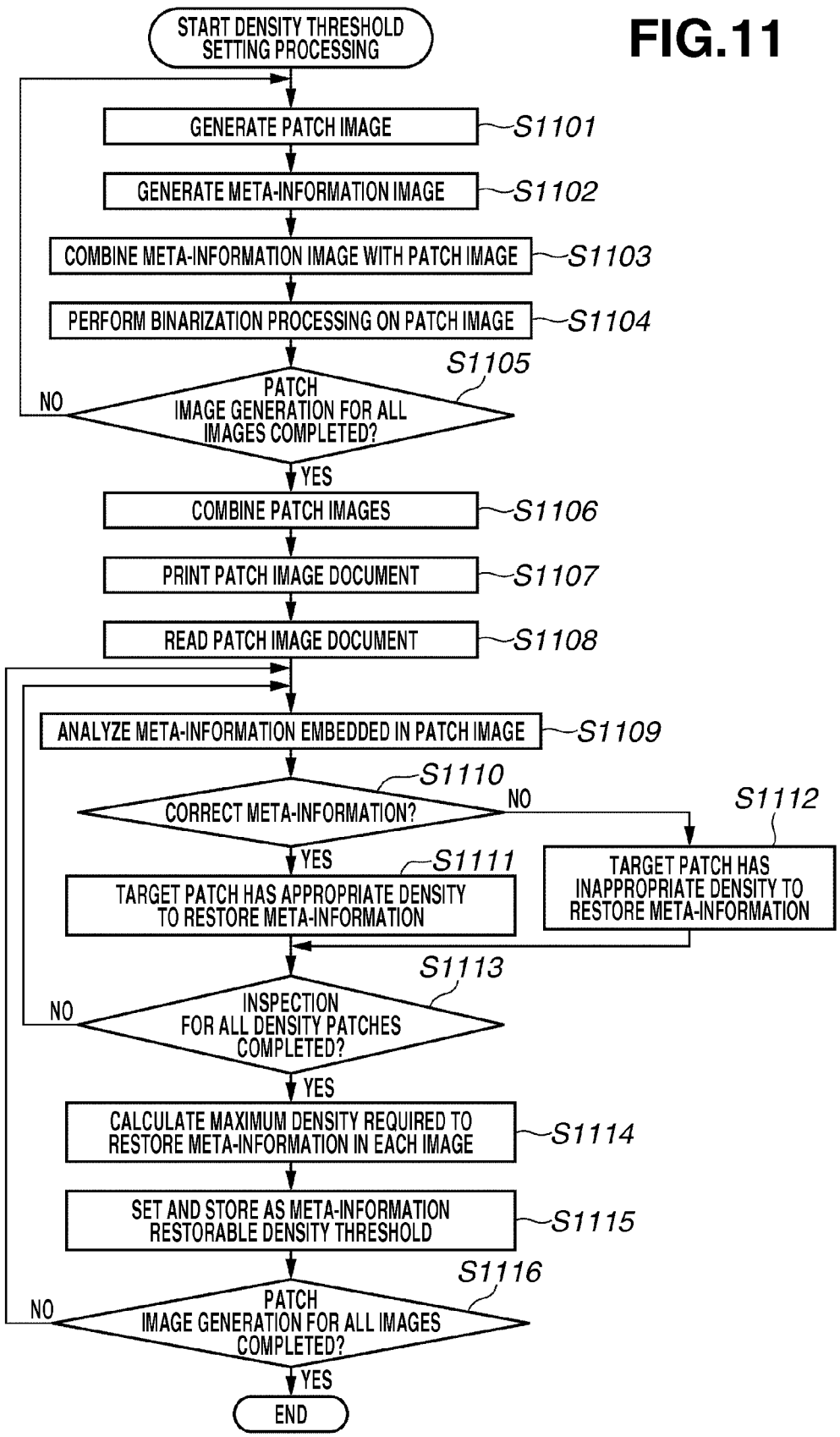
FIG. 11 is a flowchart illustrating an image density threshold setting operation, in the document image density dependent print output control, according to the first exemplary embodiment.

In step S0701, the image forming apparatus receives a selection instruction entered by a user via an operation unit (not illustrated). For example, the user selects a binarization processing method. The instructed binarization processing method is stored in image forming information, which is applied to the binarization processing illustrated in step S1104 (FIG. 11).

If the user does not select any binarization processing method, a default binarization processing method is automatically selected. The user further determines the type of an output restricting operation to be performed in step S0719, between a print output inhibition operation and a document density adjusting operation. The selected information is stored as part of setting information in an output control setting storing unit 0611.

In step S0702, the image reading unit 0601 performs document reading standby processing and, if the user instructs reading a document via the operation unit (not illustrated), performs a document reading operation with the scanner.

After completing the document reading operation, in step S0703, the meta-information storing unit 0616 confirms whether there is any setting to embed meta-information in a print output.

If embedding the meta-information is not instructed (NO in step S0703), the processing proceeds to step S0718 to perform printing of print data similar to an ordinary copy operation. In step S0718, a printing unit 0605 executes printing of a document.

If the meta-information embedding setting is present (YES in step S0703), the processing proceeds to step S0704. In step S0704, the meta-information image generating unit 0615 generates meta-information (copy restriction information, trace information, etc.) referring to the settings stored in the meta-information storing unit 0616, and generates a meta-information image representing the meta-information using the LVBC.

In step S0705, an image analyzing unit 0606 calculates an average density of the document based on image data of the read document.

In step S0706, the image analyzing unit 0606 determines whether the average density of the document is within a predetermined range. More specifically, the image analyzing unit 0606 determines whether the average density is not smaller than a threshold "A" and not greater than a threshold "B."

The threshold "A" is equivalent to a half of the density to be determined in step S1114 (i.e., the maximum density that can restore the meta-information). For example, if the density to be determined in step S1114 is 50, the threshold "A" is 25. The threshold "B" is equivalent to twice the density to be determined in step S1114. For example, if the density to be determined in step S1114 is 50, the threshold "B" is 100. The numerical values for the thresholds "A" and "B" can be experimentally obtained as values ensuring the restoration of the meta-information.

If the image analyzing unit 0606 determines that the average density of the document is out of the predetermined range (NO in step S0706), the processing proceeds to step S0707. In step S0707, the image analyzing unit 0606 determines whether the average density of the document is less than "A." If the average density of the document is less than the lower limit "A" (YES in step S0707), the processing proceeds to step S0717. Namely, when the average density of the document is less than the lower limit "A", it is determined that the average density of the document is too low to perform the processing of steps S0709 and S0714. Therefore, the image forming apparatus allows performing an ordinary printing operation.

If the determination result in step S0707 is "NO", namely when the average density of the document is greater than the upper limit "B", the processing proceeds to step S0720. In step S0720, an output control determining unit 0610 cancels the copy job. Namely, when the average density of the document is greater than the upper limit "B", it is determined that the average density of the document is too high to perform the processing of steps S0709 and S0714. Therefore, the image forming apparatus forcibly inhibits the print processing. As additional processing in step S0720, the image forming apparatus can generate warning via the user interface (not illustrated). In this case, the image forming apparatus inhibits the print processing or prints a document image only if it is allowed by the user.

If detailed inspections are not required as a result of the above-described simple inspections performed in steps S0706 and S0707, the overall processing time can be greatly decreased.

If in step S0706 the image analyzing unit 0606 determines that the average density of the document is within the predetermined range (YES in step S0706), the processing proceeds to step S0708 to perform the following control procedure.

More specifically, the image analyzing unit 0606 performs an inspection as to whether any embedded meta-information can be accurately restored from a print output result generated by the image forming apparatus, when the image forming apparatus reads a resultant composite image including the generated meta-information image combined with the document image.

First, in step S0708, the image analyzing unit 0606 checks the position of each dot constituting the meta-information image and detect the image density of its peripheral pixels. In step S0709, it is determined whether the image density exceeds a predetermined threshold. In the present exemplary embodiment, the peripheral pixels represent an area not including any dot in an area 0802 illustrated in FIG. 8. The area 0802 is a rectangular block area including only one dot constituting a two-dimensional bar code and segmented by four grid lines. The image density is an average density of the area 0802.

Figure 8:
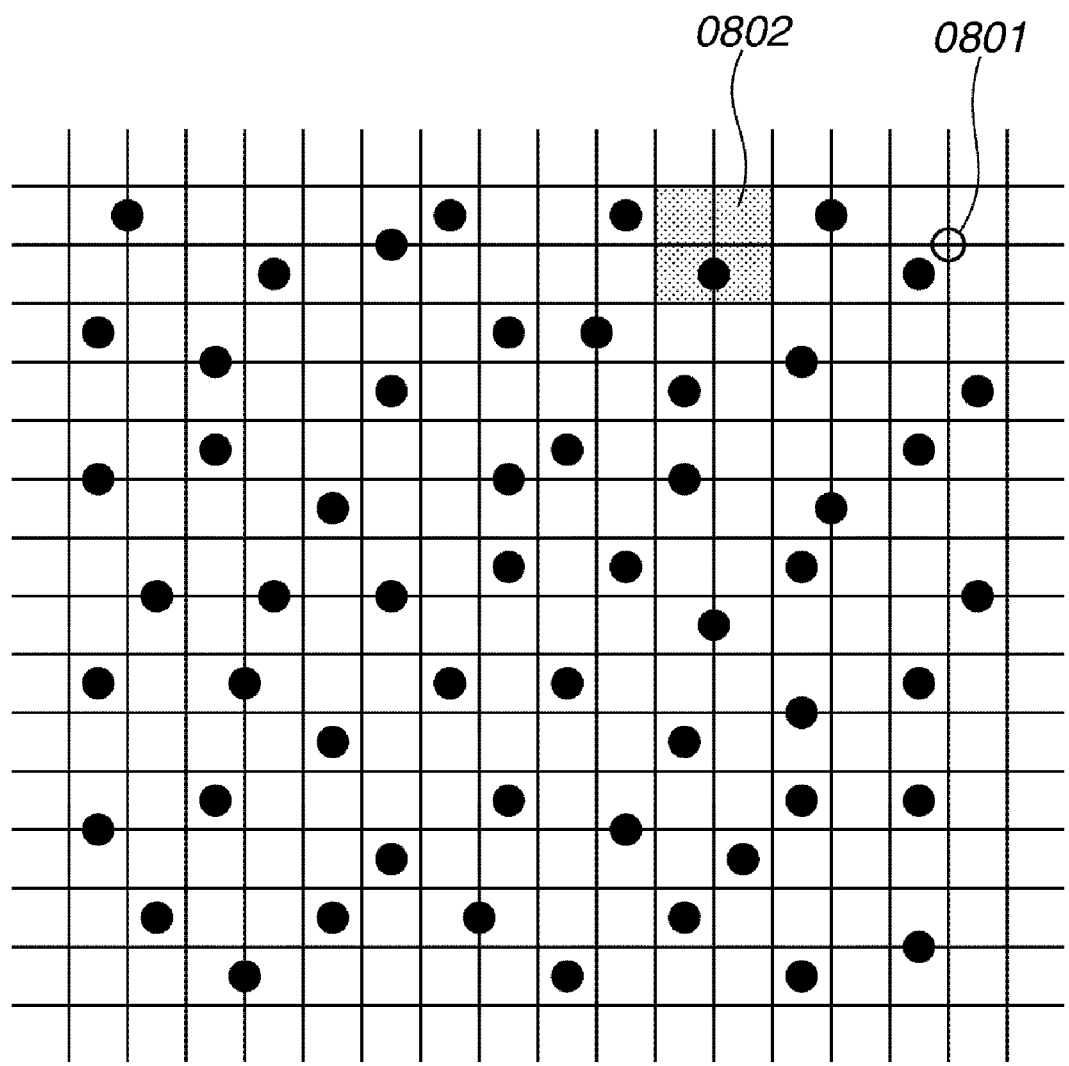
FIG. 8 illustrates an inspection to check the position of each dot constituting meta-information and the image density of its peripheral pixels according to the first exemplary embodiment.

FIG. 8 illustrates virtual grids 0801 to be used when the LVBC dots are generated. The area 0802 is an area in which the LVBC dot is dislocated, and is an area not overlapping with the neighboring LVBC dot area. The border between the area 0802 and an area including the neighboring dot is a midline between the virtual gridlines.

If the image density of the peripheral pixels exceeds the predetermined threshold (YES in step S0709), the processing proceeds to step S0710. In step S0710, the image analyzing unit 0606 determines that the target LVBC dot cannot be detected as an LVBC dot. If the image density of the peripheral pixels does not exceed the predetermined threshold (NO in step S0709), the processing proceeds to step S0711. In step S0711, the image analyzing unit 0606 determines that the target LVBC dot can be detected as an LVBC dot. An example method for determining the above-described image density threshold is described below in detail.

In step S0712, it is determined whether the processing of steps S0708 to S0711 has been completed for all LVBC dots to be combined with the document image. If the determination result is NO in step S0712, the image analyzing unit 0606 repeats the processing of steps S0708 to S0711 to determine whether the remaining dots are detectable.

If the image analyzing unit 0606 determines that the processing of steps S0708 to S0711 has been completed for all LVBC dots (YES in step S0712), the processing proceeds to step S0713. In step S0713, the image analyzing unit 0606 calculates a ratio of the undetectable LVBC dots to all LVBC dots having been inspected in the previous steps, referring to the number of the dots determined as being undetectable.

In step S0714, it is determined whether the ratio of the undetectable dots obtained in step S0713 exceeds a predetermined threshold. If the ratio of the undetectable dots exceeds the predetermined threshold (YES in step S0714), the processing proceeds to step S0715. In step S0715, the image analyzing unit 0606 determines that the meta-information is unrestorable from the print product. This is because, if the ratio of the undetectable LVBC dots to all LVBC dots exceeds the predetermined threshold, the meta-information cannot be accurately restored from the LVBC dots even if error correction or comparable processing is applied to the dots.

The document image includes various types of images (e.g., an image having a uniform density, an image having a locally increased or decreased density, etc.). Therefore, the meta-information cannot be accurately restored by simply comparing a density threshold determined depending on a patch with the average density of the document image. Accordingly, the present exemplary embodiment performs detailed inspection processing in the above-described steps S0706, S0709, and S0714, to accurately restore the meta-information. An example method for determining the above-described threshold to be used to determine whether the meta-information is restorable is described below in detail.

If the ratio of the undetectable LVBC dots does not exceed the predetermined threshold (NO in step S0714), the processing proceeds to step S0716. In step S0716, the image analyzing unit 0606 determines that the meta-information is restorable from the document image. In step S0717, the image combining unit 0603 combines the document image with the meta-information image to perform print processing of a meta-information added image. In step S0718, the printing unit 0605 executes the print processing to output a print product.

If the ratio of the undetectable LVBC dots exceeds the predetermined threshold (YES in step S0714), the processing proceeds to step S0715. In step S0715, the image analyzing unit 0606 determines that the meta-information is unrestorable from the target document image that includes an embedded meta-information image. Therefore, in step S0719, the output control determining unit 0610 executes an output restricting operation, which has been set by the user. The output control determining unit 0610 refers to the setting information stored in the output control setting storing unit 0611 and executes the print output inhibition operation or the document density adjusting operation, which has been designated beforehand by the user.

In general, if it is determined that the meta-information is unrestorable from the document image, there is a higher possibility that a print output of the document image may become a security hole. Therefore, if the print output inhibition operation is selected by the user, the processing proceeds to step S0720. In step S0720, the output control determining unit 0610 forcibly cancels the copy job of the target document and inhibits printing the document image.

If the document density adjusting operation is selected by the user, the processing proceeds to step S0721. In step S0721, an image processing unit 0602 performs image processing on the document image having been identified in step S0715 (i.e., the document image from which the meta-information is unrestorable). For example, the image processing unit 0602 reduces the density of the document image to a level at which the meta-information can be restored. Then, in step S0717, the image combining unit 0603 combines the document image having been subjected to the image processing of step S0721 with the meta-information image. In step S0718, the printing unit 0605 executes print processing to output a print product.

To reduce the density of the document image, the output control determining unit 0610 can designate appropriate processing suitable to the target document image, which can be selected from various image processing. For example, the selectable image processing includes the processing for uniformly reducing the density of the entire document image, the processing for locally reducing the density at each portion of the document image where the density exceeds a threshold, and the processing for reducing the density of a non-character portion of the document image.

The threshold used in the above-described inspection of step S0706 is the average density of the document. However, a physical amount other than the average density can be also used as a threshold for the determination.

For example, it is desired to use the average density of a central portion, where the above-described dot is present, that tends to have a higher density compared to the outer peripheral portion. This is because, if the density of the central portion is low, the density of the outer peripheral portion can be also low, and, therefore, the meta-information image can be combined with the document image. In this case, the processing speed can be increased.

Alternatively, it is desired to use the weighted average density, which can be obtained by multiplying the density of the central portion with a higher weighting coefficient and multiplying the density of the outer peripheral portion with a lower weighting coefficient.

Additionally, it is desired to refer to a density histogram of the entire document and determine whether the offset of the histogram (offset to the high density side) exceeds a predetermined threshold. In the present exemplary embodiment, determining whether the offset of the density histogram exceeds the threshold is equivalent to determine whether the density of the document image exceeds a threshold.

As described above, in the processing for controlling the print output based on the document image density, the determination whether the LVBC dot combined with the document image is detectable is performed based on the image density. Therefore, as a reference value to be used in the determination, it is necessary to store a threshold for the document image density to be used to determine whether the LVBC dot is detectable.

To obtain the threshold, the image forming apparatus according to the present exemplary embodiment outputs various patch data differentiated in density beforehand and determines an optimum value for the threshold based on a result obtained by the scanner and stores the threshold.

Figure 9:
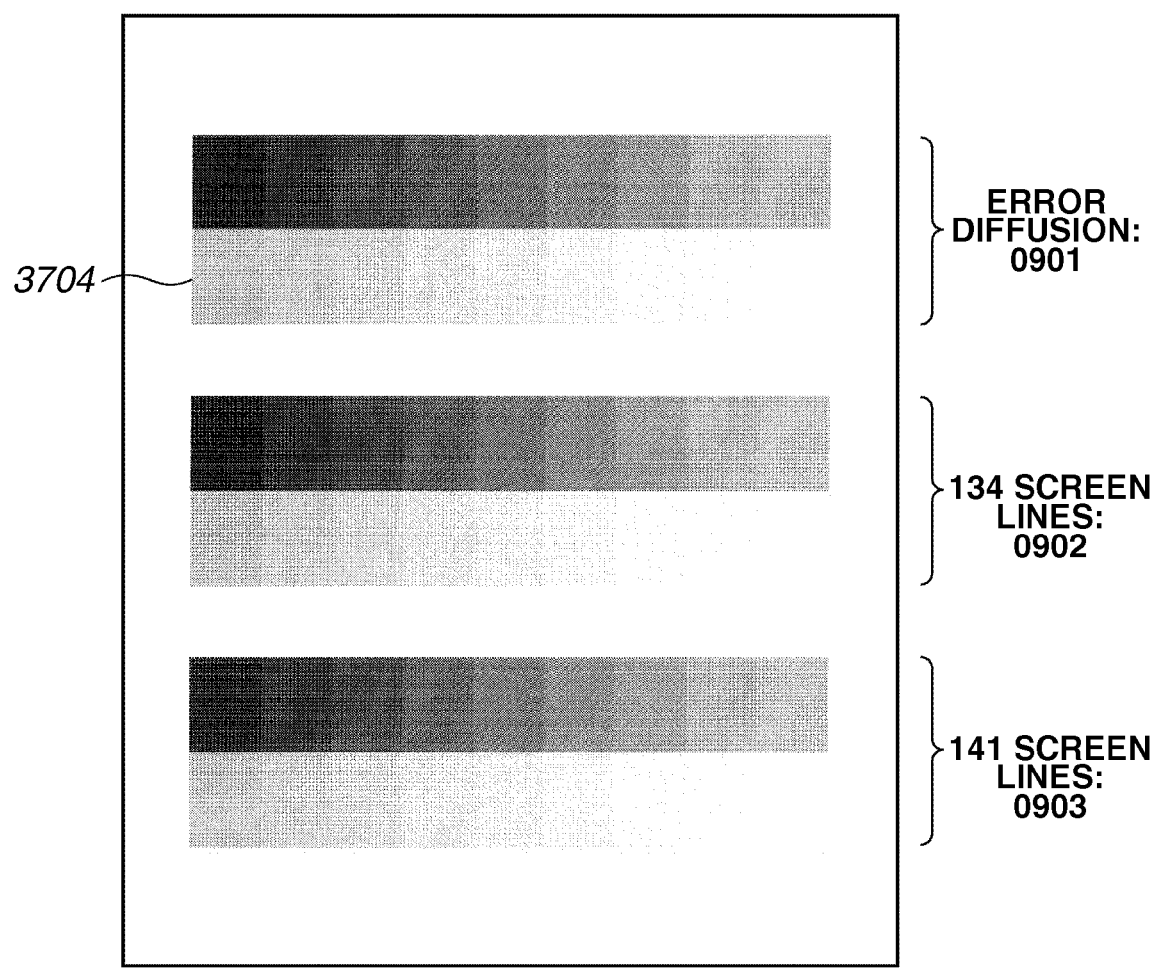
FIG. 9 illustrates example patch data to be used for an image density threshold setting in the document image density dependent print output control.

FIG. 9 illustrates example patch images. The patch image includes a plurality of patch areas differentiated in density, e.g., eighteen blocks from density 0 to maximum density, as indicated by 3704 in FIG. 9. Each patch area includes a meta-information image combined (embedded) as part of a background image. The patch image can be formed uniquely according to the type of the binarization processing, e.g., error diffusion, 134 screen lines, and 141 screen lines, as indicated by 0901 to 0903 in FIG. 9.

The reason why the patch image is formed uniquely depending on the type of the binarization processing as illustrated in FIG. 9 is that the possibility of the meta-information restoration depends on the type of the binarization processing applied to a target composite image where a two-dimensional bar code obtained by visualizing an image of the meta-information is combined with a document.

Figure 10:
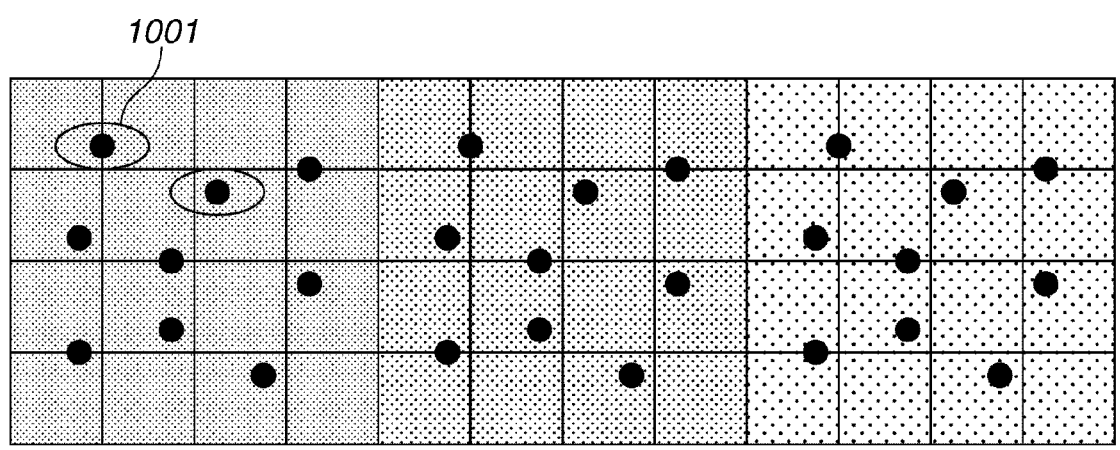
FIG. 10 illustrates example patch data to be used for the image density threshold setting in the document image density dependent print output control according to the first exemplary embodiment.

As illustrated in FIG. 10, each patch area includes LVBC dots. When an output patch image is read by the scanner, the meta-information cannot be restored from a patch area having a higher density as a result of restoration of the meta-information.

More specifically, if a patch image including the LVBC dots has a higher density (see 1001 in FIG. 10), detection of the LVBC dots cannot be accurately performed. Therefore, it is desired to identify a patch area having a highest density among the patch areas having been successful in restoring the meta-information, and set the density of the identified patch area as the threshold for the document image density.

FIG. 11 illustrates an example operation flow of the above-described document image density threshold setting processing.

In the document image density threshold setting processing illustrated in FIG. 11, to determine the document image density threshold, in step S1101, a patch data generating unit 0613 generates a patch image based on patch data information stored in a patch data information storing unit 0614.

In step S1102, the meta-information image generating unit 0615 generates a meta-information image as a background image to be combined with the patch image.

In step S1103, the image combining unit 0603 combines the meta-information image generated in step S1102 with the patch image generated in step S1101.

In step S1104, a halftone processing unit 0604 performs binarization processing, which is required to generate a print output of a patch image including LVBC dots representing the meta-information (i.e., a meta-information image). A halftone information storing unit 0612 stores image forming information to be used in a meta-information adding print, from which the binarization processing method can be selected.

Similarly, the patch data generating unit 0613 performs patch generation processing on image forming information to be used in other meta-information adding print (steps S1101 to S1105). Then, in step S1106, the generated images are combined as one or more document images.

In step S1107, the printing unit 0605 prints a patch image document generated based on the image forming information.

In step S1108, the image reading unit 0601 performs reading processing on the printed patch image document with the scanner.

In step S1109, the image analyzing unit 0606 analyzes the read patch image to determine a threshold. In the present exemplary embodiment, the image analyzing unit 0606 performs meta-information analysis/restoration processing for each density patch.

In step S1110, the meta-information restoring unit 0608 inspects whether the meta-information restored from each density patch is correct data. If the meta-information restored from the target density patch is correct data (YES in step S1110), the processing proceeds to step S1111. In step S1111, the image analyzing unit 0606 determines that the target density patch has a sufficient image density to restore the meta-information.

If the meta-information restored from the target density patch is incorrect data (NO in step S1110), the processing proceeds to step S1112. In step S1112, the image analyzing unit 0606 determines that the target density patch has an inappropriate image density to restore the meta-information.

In step S1113, it is determined whether the above-described inspection (processing of steps S1109 to S1112) has been completed for all density patches. If the determination result is YES in step S1113, the processing proceeds to step S1114. In step S1114, the image analyzing unit 0606 identifies a density patch having a highest density among the density patches having been successful in restoring the meta-information, and obtains a density value of the identified density patch.

In step S1115, a setting information generating unit 0609 sets and stores the density value of the density patch identified in step S1114, as meta-information restorable density threshold in the target image formation corresponding to the selected binarization processing. The density threshold having been determined and stored in step S1115 is used in step S0705.

The above-described sequential operations of steps S1109 to S1116, including the analysis of each patch image and the setting/storage of the density threshold, are performed for each image formation. The determined density threshold is set and stored for each image formation.

In general, in the restoration of the meta-information embedded in a document, detection of all LVBC dots is not required. This is because, when a meta-information image (LVBC dots) is combined with a document image, the block having a dot pattern representing the meta-information is repetitively printed to ensure an appropriate redundancy and the dot conversion is performed in a similar fashion.

Figure 12:
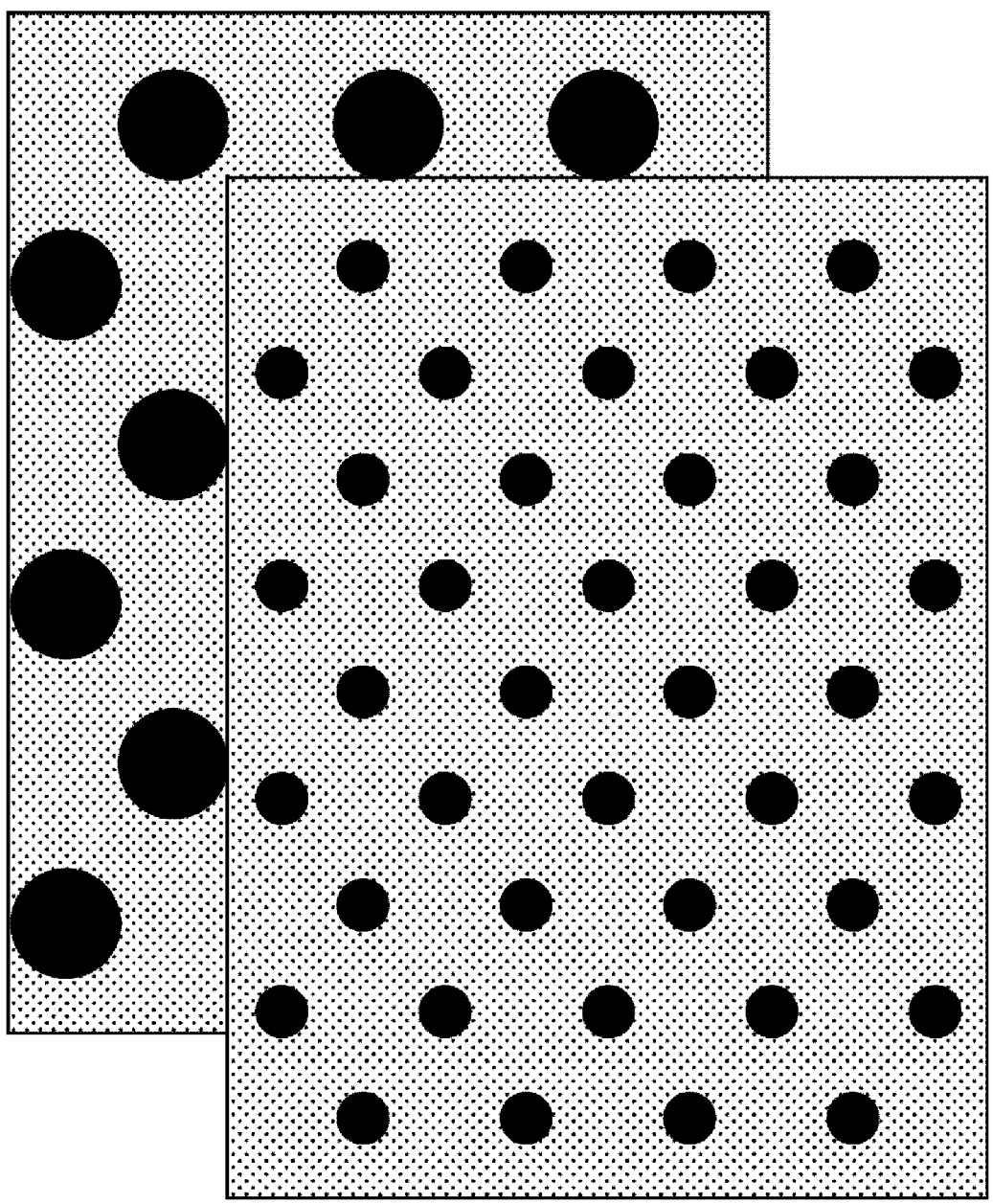
FIG. 12 illustrates example patch data to be used for a detection dot threshold setting, in the document image density dependent print output control, according to the first exemplary embodiment.

However, in the case where the print output is controlled based on the density of a document image, an appropriate reference is required to set the ratio of detectable dots to all LVBC dots on the document image to be used to determine whether the meta-information embedded in the document can be accurately restored. In this respect, the present exemplary embodiment sets a threshold as a ratio of accurately detectable LVBC dots, which are required to restore the data, relative to all LVBC dots. To set the threshold, the image forming apparatus outputs various patterns of patch data as illustrated in FIG. 12, reads respective patch data with the scanner, and determines an appropriate value for the threshold based on a restored result of the meta-information.

Figure 13:
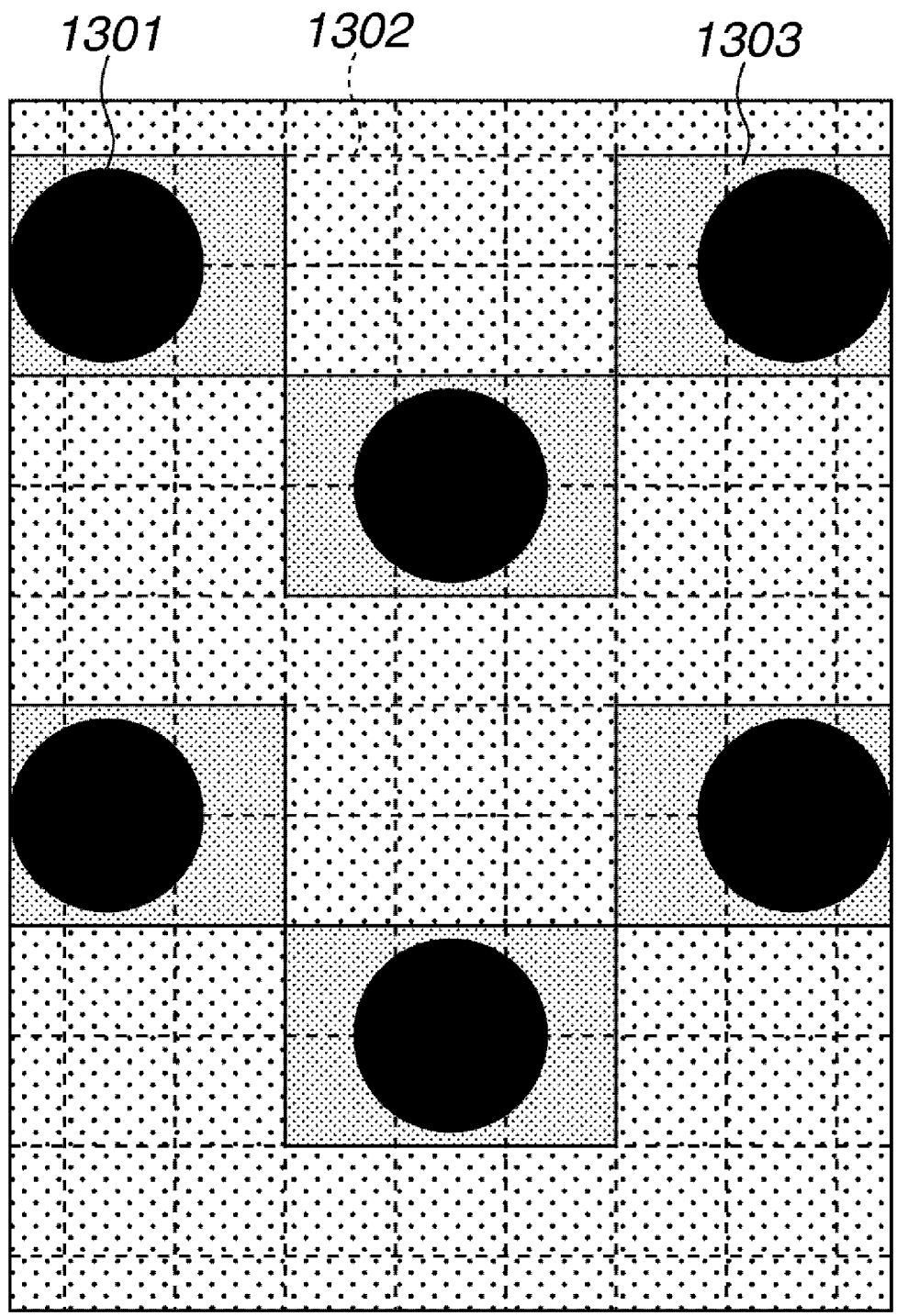
FIG. 13 illustrates example patch data usable for the detection dot threshold setting, in the document image density dependent print output control, according to the first exemplary embodiment.

FIG. 13 illustrates an example patch data. In FIG. 13, a jamming pattern 1301 has a function of blocking part of the LVBC dots from being detected. The jamming pattern 1301 is randomly inserted in an image. The ratio of the detectable LVBC dots is variable depending on the ratio of the jamming pattern 1301.

In FIG. 13, a grid block 1302 includes a dot repetition pattern converted from the meta-information. Due to the presence of the jamming pattern 1301, dot information cannot be accurately detected from LVBC dots located in a block 1303. The meta-information cannot be restored (cannot be decoded). As each block includes the embedded meta-information, it is theoretically desirable that the information is restorable from all blocks. However, an error correcting code is generally added to an actual two-dimensional bar code (a visualized image of the meta-information) to be combined with a document image.

Therefore, if the number of blocks that can restore the data exceeds a predetermined value, the embedded meta-information can be correctly restored. In this case, the required number of blocks that can restore the data is variable depending on the performances of each image forming apparatus. Further, the threshold required to accurately restore the data can be a ratio of the detectable LVBC dots in a specific patch data, which is largest in the ratio of jamming patterns and smallest in the ratio of the detectable LVBC dots, among the patch data satisfying the required number of data restorable blocks.

Figure 14:
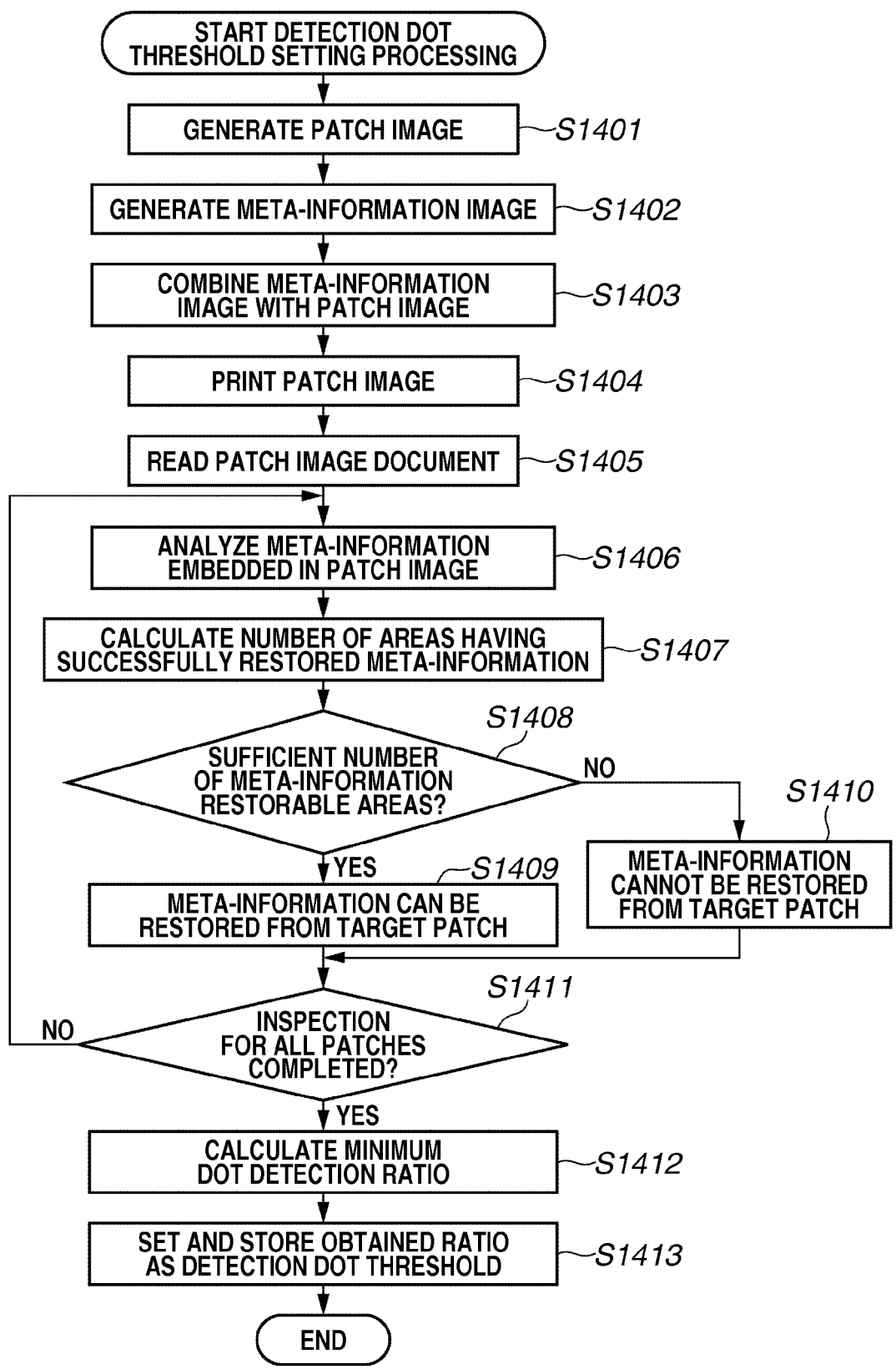
FIG. 14 is a flowchart illustrating a detection dot threshold setting operation, in the document image density dependent print output control, according to the first exemplary embodiment.

FIG. 14 illustrates an operation flow for the above-described LVBC detection dot threshold setting processing.

In step S1401, to determine the threshold for the detection dot ratio required to restore the meta-information, the patch data generating unit 0613 generates various patterns of patch images including the jamming patterns applied to the LVBC dots.

Figure 15:
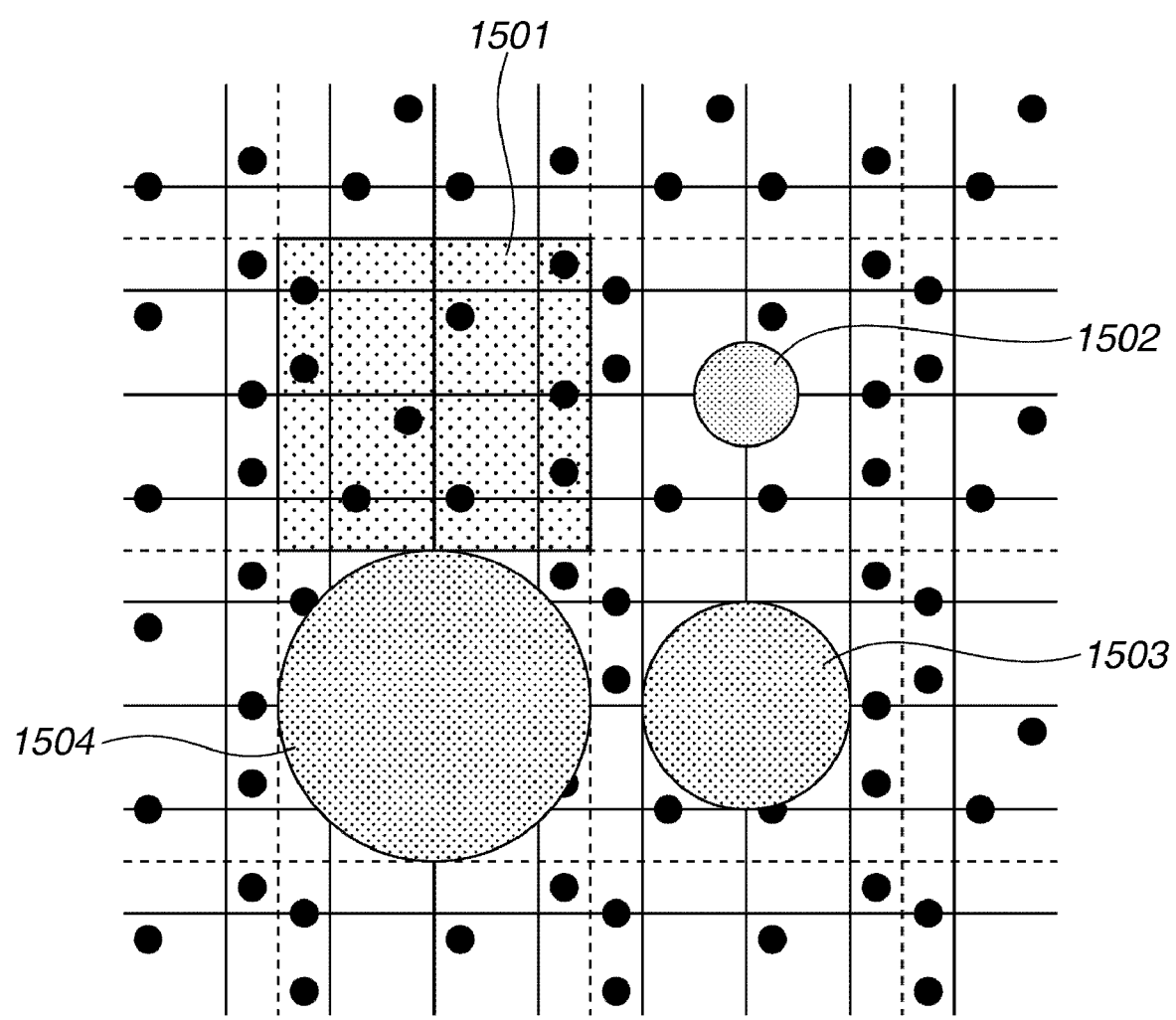
FIG. 15 illustrates example patch data to be used for the detection dot threshold setting, in the document image density dependent print output control, according to the first exemplary embodiment.

FIG. 15 illustrates an example patch image to be used in the detection dot threshold setting. In FIG. 15, a unit block 1501 is an area to be combined, when an LVBC meta-information image is combined as a background image. The unit block 1501 is repetitively printed on the entire sheet to assure satisfactory redundancy in restoring the embedded meta-information. The grid indicated by solid lines illustrated in FIG. 15 is a virtual grid for the LVBC dots. The patch image illustrated in FIG. 15 includes jamming patterns 1502 to 1504, which are added to intentionally prevent the meta-information from being restored, to obtain the number of LVBC dot areas (meta-information areas) required in the restoration of the meta-information.

The smallest jamming pattern 1502 has a size corresponding to a unit area of the LVBC grid block. The intermediate jamming pattern 1503 is 2×2 times the smallest jamming pattern 1502. The largest jamming pattern 1504 is 3×3 times the smallest jamming pattern 1502 and is equivalent to a meta-information embedding unit area. The center of each jamming pattern is positioned on the center of the meta-information embedding unit area. The jamming patterns are repetitively located on the entire sheet or can be randomly combined.

In step S1402, the meta-information image generating unit 0615 generates a meta-information image to be combined with the patch images. The processing in step S1402 is necessary to determine whether the embedded meta-information is restorable in each patch.

In step S1403, the image combining unit 0603 combines the meta-information image generated in step S1402 with the patch images generated in step S1401.

In step S1404, the printing unit 0605 prints the output image of each combined patch on a sheet as a document.

In step S1405, the image reading unit 0601 reads the document including the output patch images.

The image analyzing unit 0606 analyzes the read patch image to determine the above-described LVBC detection dot threshold, as described below.

In step S1406, the image analyzing unit 0606 performs meta-information analysis/restoration processing for each patch.

In step S1407, the meta-information restoring unit 0608 obtains the number of meta-information areas from which the meta-information can be successfully restored through the meta-information restoring processing performed on each patch.

In step S1408, the meta-information restoring unit 0608 determines whether the target patch is a patch from which meta-information can be restored based on the number of the meta-information areas obtained in step S1407.

If the calculated number of the areas having been successful in restoring the meta-information exceeds the number of areas required to accurately restore the meta-information (YES in step S1408), which is determined according to the LVBC specification, the processing proceeds to step S1409. In step S1409, the setting information generating unit 0609 determines and registers that the target patch can restore the meta-information.

If the number of the LVBC areas having been successful in restoration of the meta-information is equal to or less than the number of areas required to accurately restore the meta-information (NO in step S1408), the processing proceeds to step S1410. In step S1410, the setting information generating unit 0609 determines and registers that the target patch is a patch from which the meta-information cannot be accurately restored. In other words, the setting information generating unit 0609 determines and registers that the meta-information is unrestorable.

The setting information generating unit 0609 performs the above-described inspection for all patches (steps S1406 to S1411). If the processing of steps S1406 to S1411 is completed for all patches (YES in step S1411), the processing proceeds to step S1412. In step S1412, the setting information generating unit 0609 identifies a patch largest in the ratio of jamming patterns and smallest in the ratio of detectable LVBC dots among the patches having been registered as capable of accurately restoring the meta-information. The setting information generating unit 0609 obtains the ratio of the detectable LVBC dots of the identified patch.

In step S1413, an image analysis setting storing unit 0607 sets and stores the ratio obtained in step S1412 as the LVBC detection dot threshold required to restore the meta-information.

Figure 16:
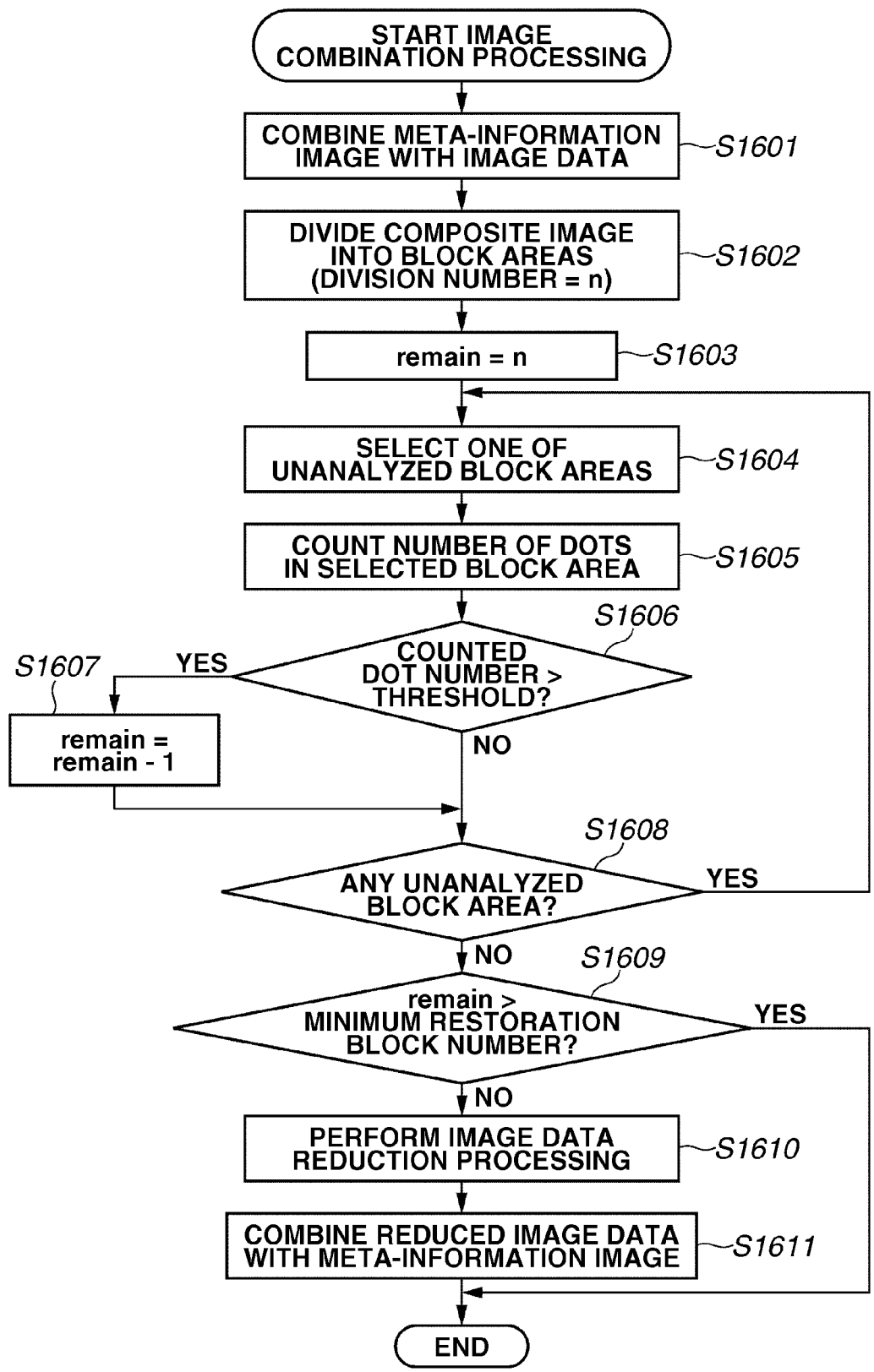
FIG. 16 is a flowchart illustrating an operation flow in an image combining unit according to a second exemplary embodiment of the present invention.

FIG. 16 is a flowchart illustrating an example operation of the image combining unit 0302 according a second exemplary embodiment of the present invention.

In the above-described operation performed by the image combining unit 0302 according to the first exemplary embodiment, the meta-information and the document image data are simply combined. The second exemplary embodiment is different from the first exemplary embodiment in the following features.

In step S1601, the image combining unit 0302 combines a meta-information image with image data having not yet combined with any meta-information image serving as part of a background image.

In step S1602, the image combining unit 0302 divides the composite image obtained in step S1601 into a plurality of block areas each having predetermined sizes in vertical and horizontal directions. For example, each block area has a vertical size of 32 dots and a horizontal size of 32 dots. In FIG. 16, "n" represents the number of divided block areas.

In step S1603, the image combining unit 0302 sets a parameter "remain" to "n", wherein the parameter "remain" indicates the number of the blocks including the meta-information (i.e., blocks from which the meta-information can be read). The following is the processing to be performed for each block.

In step S1604, the image combining unit 0302 selects one of unanalyzed block areas. For example, the image combining unit 0302 can select, as a processing target, the unanalyzed block area positioned closest to the left edge of the top line (first line) of the image data until the processing target reaches the rightmost unanalyzed block area. If no unanalyzed block area remains on the first line, the image combining unit 0302 shifts the processing target to the next line (second line) and restarts the similar processing.

In step S1605, the image combining unit 0302 counts the number of dots in the selected block area. In this case, the image is scanned in three (i.e., vertical, horizontal, and diagonal) directions. If the gap is detectable in all directions, the image combining unit 0302 counts it as one dot.

In step S1606, it is determined whether the number of dots counted in step S1605 exceeds a predetermined threshold (e.g., 32 dots). If the number of dots counted in step S1605 exceeds the predetermined threshold (YES in step S1606), the image combining unit 0302 recognizes that the target block area includes many dots constituting a halftone image in addition to the LVBC dots representing the meta-information. The presence of the dots constituting a halftone image disables restoring the meta-information from the block area. Therefore, in step S1607, the image combining unit 0302 decrements the parameter "remain" by 1.

In step S1608, the image combining unit 0302 determines whether any unanalyzed block area remains. If there is any unanalyzed block area (YES in step S1608), the processing returns to step S1604. Otherwise (NO in step S1608), the processing proceeds to step S1609.

In step S1609, the image combining unit 0302 determines whether the parameter "remain" is greater than a predetermined minimum restoration block number (i.e., the smallest number of blocks required to restore the meta-information). If the parameter "remain" is greater than the predetermined minimum restoring block number (YES in step S1609), the image combining unit 0302 adopts the image data combined in step S1601 without applying any processing thereon. Otherwise (NO in step S1609), the processing proceeds to step S1610, in which the image combining unit 0302 performs reduction processing on the image data that is not yet combined.

The reduction processing on the image data is performed to secure an area enough for combining the meta information. The minimum area needed therefor is the minimum restoring block number multiplied by a block area. Therefore, the image data is reduced to secure the area described above. Various algorithms conventionally known, such as a nearest neighbor method and a linear interpolation method, can be used for the image reduction processing, although the detailed content of the method is not herein described.

In step S1611, the image combining unit 0302 combines the reduced image data with the meta-information image and adopts the obtained image data.

As described above, a blank area becomes available by performing the reduction processing. The meta-information image is combined in the blank area. Thus, a higher restoration rate can be assured regardless of the image data.

The present invention can be realized by a computer (or CPU or micro-processing unit (MPU)) in a system or an apparatus that reads software program code from a computer-readable storage medium and executes the program code to realize the procedures of the flowcharts according to the above-described exemplary embodiments. In this case, the program code itself read out from the computer-readable storage medium causes the computer to realize the functions of the above-described exemplary embodiments. Therefore, the program code and a computer-readable storage medium storing/recording the program code can constitute an aspect of the present invention.

A computer-readable storage medium supplying the program code can be selected from any one of a floppy disk, a hard disk, an optical disk, a magneto-optical (MO) disk, a compact disc-ROM (CD-ROM), a CD-recordable (CD-R), a magnetic tape, a nonvolatile memory card, and a ROM.

The functions of the above-described exemplary embodiments can be realized by the computer that executes the readout software program. Moreover, an operating system (OS) or other application software running on the computer can execute part or all of actual processing based on instructions of the programs.

The functions of the above-described exemplary embodiments can be realized by a function expansion board inserted in a computer or a function expansion unit connected to the computer. In this case, the program read out of the computer-readable storage medium can be written into a memory of the function expansion board inserted in the computer or the function expansion unit connected to the computer. Then, based on instructions of the program, a CPU provided on the function expansion board or the function expansion unit can execute part or all of the actual processing. In this respect, the functions of the above-described exemplary embodiments can be realized by the processing performed by the function expansion board and the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-087253 filed Mar. 28, 2008, which is hereby incorporated by reference herein in its entirety.

What is claimed is:

1. An image output apparatus comprising:
a determination unit configured to determine whether a density of a document image exceeds a threshold; and
a control unit configured to inhibit an output of a composite image including a two-dimensional bar code and the document image if the determination unit determines that the density exceeds the threshold, and configured to output the composite image including the two-dimensional bar code and the document image if the determination unit determines that the density does not exceed the threshold,
wherein the control unit is configured to calculate a density of the document image for each block including a dot constituting the two-dimensional bar code, and is configured to determine whether the two-dimensional bar code is detectable by checking whether the calculated density exceeds a predetermined threshold, wherein the control unit is configured to inhibit the output of the composite image including the two-dimensional bar code and the document image, if it is determined that the two-dimensional bar code is undetectable, even when the determination unit determines that the density does not exceed the threshold.

2. The image output apparatus according to claim 1, wherein the control unit is configured to calculate a ratio of undetectable dots to all dots constituting the two-dimensional bar code and is configured to determine, if the calculated ratio exceeds a predetermined value, that information of the two-dimensional bar code is unrestorable.

3. A method for controlling an image output apparatus, comprising:

determining whether a density of a document image exceeds a threshold;

inhibiting an output of a composite image including a two-dimensional bar code and the document image if the density exceeds the threshold;

outputting the composite image including the two-dimensional bar code and the document image if the density does not exceed the threshold;

calculating a density of the document image for each block including a dot constituting the two-dimensional bar code;

determining whether the two-dimensional bar code is detectable by checking whether the calculated density exceeds a predetermined threshold; and inhibiting the output of the composite image including the two-dimensional bar code and the document image, if it is determined that the two-dimensional bar code is undetectable, even when it is determined that the density does not exceed the threshold.

4. The method according to claim 3, further comprising:

calculating a ratio of undetectable dots to all dots constituting the two-dimensional bar code; and determining, if the calculated ratio exceeds a predetermined value, that information of the two-dimensional bar code is unrestorable.

5. A non-transitory computer-readable storage medium storing a program causing a computer to control an image output apparatus, the program comprising:

computer-executable instructions for determining whether a density of a document image exceeds a threshold;

computer-executable instructions for inhibiting an output of a composite image including a two-dimensional bar code and the document image if the density exceeds the threshold;

computer-executable instructions for outputting the composite image including the two-dimensional bar code and the document image if the density does not exceed the threshold;

computer-executable instructions for calculating a density of the document image for each block including a dot constituting the two-dimensional bar code;

computer-executable instructions for determining whether the two-dimensional bar code is detectable by checking whether the calculated density exceeds a predetermined threshold; and computer-executable instructions for inhibiting the output of the composite image including the two-dimensional bar code and the document image, if it is determined that the two-dimensional bar code is undetectable, even when it is determined that the density does not exceed the threshold.

6. The non-transitory computer-readable storage medium according to claim 5, the program further comprising:

computer-executable instructions for calculating a ratio of undetectable dots to all dots constituting the two-dimensional bar code; and computer-executable instructions for determining, if the calculated ratio exceeds a predetermined value, that information of the two-dimensional bar code is unrestorable.

* * * * *